United States Patent
Tamaoka et al.

(10) Patent No.: US 9,909,813 B2
(45) Date of Patent: Mar. 6, 2018

(54) HEAT MODULE

(71) Applicant: NIDEC CORPORATION, Kyoto (JP)

(72) Inventors: Takehito Tamaoka, Kyoto (JP);
Kazuhiko Fukushima, Kyoto (JP);
Koji Hatanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 366 days.

(21) Appl. No.: 14/617,203

(22) Filed: Feb. 9, 2015

(65) Prior Publication Data

US 2015/0362258 A1 Dec. 17, 2015

(30) Foreign Application Priority Data

Jun. 13, 2014 (JP) ................................ 2014-122755

(51) Int. Cl.
*F28D 15/00* (2006.01)
*F28D 15/02* (2006.01)
*G06F 1/20* (2006.01)

(52) U.S. Cl.
CPC ..... *F28D 15/0233* (2013.01); *F28D 15/0275* (2013.01); *G06F 1/203* (2013.01)

(58) Field of Classification Search
CPC .......... F28D 15/00; F28D 15/02; F28D 15/04; F28D 15/0233; F28D 15/0275; F28F 7/00; H05K 7/20; H05K 7/20336; G06F 1/20; G06F 1/203
USPC .......................... 165/104.19, 104.21, 104.26
See application file for complete search history.

(56) References Cited

U.S. PATENT DOCUMENTS

| | | | | |
|---|---|---|---|---|
| 6,069,791 A * | 5/2000 | Goto | ........................ | G06F 1/203 165/104.33 |
| 8,289,699 B2 * | 10/2012 | Hwang | ............... | F28D 15/0233 165/104.21 |
| 2002/0179288 A1 * | 12/2002 | Ishida | ................... | B21C 37/151 165/104.26 |
| 2010/0139895 A1 * | 6/2010 | Hwang | .................. | H01L 23/427 165/104.26 |
| 2010/0155030 A1 * | 6/2010 | Hwang | ............... | F28D 15/0233 165/104.26 |
| 2011/0005728 A1 * | 1/2011 | Hong | ........................ | G06F 1/20 165/104.26 |
| 2011/0186269 A1 * | 8/2011 | Yang | ....................... | F28D 15/04 165/104.26 |
| 2011/0277963 A1 * | 11/2011 | Chiou | ................... | H01L 23/427 165/104.26 |

(Continued)

*Primary Examiner* — Keith Raymond
*Assistant Examiner* — Gustavo Hincapie Serna
(74) *Attorney, Agent, or Firm* — Westerman, Hattori, Daniels & Adrian, LLP

(57) ABSTRACT

A heat module includes a fan and a heat pipe. A flat portion of the heat pipe includes a recessed portion being recessed toward a center of the heat pipe in a cross section. A heat receiving portion arranged between the heat source and the heat pipe includes a heat source contact portion arranged to be in thermal contact with the heat pipe. In at least a portion of the heat pipe which extends between a portion of the heat pipe which is in thermal contact with the fan contact portion and a portion of the heat pipe which is in thermal contact with the heat source contact portion, a difference between a maximum axial height of the heat pipe and a minimum axial height of a portion of the heat pipe where the recessed portion is defined is smaller than a wall thickness of the recessed portion.

10 Claims, 6 Drawing Sheets

(56) References Cited

U.S. PATENT DOCUMENTS

| | | | | |
|---|---|---|---|---|
| 2012/0018132 A1* | 1/2012 | Chen | .................... | F28D 15/0275 |
| | | | | 165/104.21 |
| 2012/0099278 A1* | 4/2012 | Chen | .................... | F28D 15/0233 |
| | | | | 361/697 |
| 2012/0293958 A1* | 11/2012 | Lee | ...................... | H01L 23/427 |
| | | | | 361/696 |
| 2012/0320526 A1* | 12/2012 | Wang | .................... | H01L 23/427 |
| | | | | 361/696 |
| 2013/0264033 A1* | 10/2013 | Huang | .................... | G06F 1/203 |
| | | | | 165/104.26 |
| 2013/0269913 A1* | 10/2013 | Ueda | .................... | F28D 15/0233 |
| | | | | 165/104.26 |
| 2014/0102670 A1* | 4/2014 | Tu | .......................... | F28D 15/02 |
| | | | | 165/104.26 |
| 2014/0182818 A1* | 7/2014 | Wang | .................... | H01L 23/427 |
| | | | | 165/104.21 |
| 2014/0290908 A1* | 10/2014 | Wang | .................. | F28D 15/0266 |
| | | | | 165/80.2 |
| 2014/0290918 A1* | 10/2014 | Chen | ...................... | G06F 1/203 |
| | | | | 165/121 |
| 2014/0332185 A1* | 11/2014 | Chen | ...................... | B23P 15/26 |
| | | | | 165/104.21 |
| 2015/0000872 A1* | 1/2015 | Jang | ...................... | H01L 23/427 |
| | | | | 165/104.21 |

* cited by examiner

HEAT MODULE

BACKGROUND OF THE INVENTION

1. Field of the Invention

The present invention relates to a heat module. In particular, the present invention relates to a heat module installed in an electronic device, such as, for example, a personal computer (PC).

2. Description of the Related Art

Small and high-performance electronic devices, such as, for example, notebook PCs, produce a large amount of heat at CPUs and the like inside cases thereof. This makes it important to take measures against the heat. One common measure against the heat is to install blower fans inside the cases to discharge the heat. In a common heat module in which a heat source and a heat sink are arranged to be away from each other, the heat source and the heat sink are connected to each other through a heat pipe. Meanwhile, in recent years, electronic devices, such as the notebook PCs, have been becoming thinner and thinner, and there has been a demand for a reduction in the thickness of heat modules. In a heat module, a heat receiving sheet is arranged between the heat source and the heat pipe, and the heat receiving sheet is arranged to axially overlap with the heat pipe. In addition, the heat pipe is arranged to axially overlap with a fan including the heat sink. Thus, to reduce the thickness of the heat module, it is essential to reduce the thickness of the heat pipe. The heat pipe has a cavity inside it, and a working fluid is arranged in the cavity. The working fluid receives heat from the heat source at one end of the heat pipe, and is vaporized. A vaporized portion of the working fluid spreads inside the heat pipe while traveling toward an opposite end of the heat pipe, and is condensed due to increased pressure to dissipate heat. Further, the heat sink is arranged at the opposite end of the heat pipe to facilitate dissipation of heat of the vaporized portion of the working fluid. The portion of the working fluid which has dissipated heat near the heat sink needs to return toward the heat source to continue to dissipate heat. Thus, a capillary structure through which the working fluid is able to travel by capillary action is arranged inside the heat pipe. Due to a reduction in the thickness of the heat pipe, the capillary structure may become deformed to impede travel of the working fluid.

Thus, a variety of heat pipes in which travel of the working fluid is not impeded by a deformation of the capillary structure have been devised. JP-A 2000-074579, for example, discloses a heat pipe including a container having a cavity with a flat cross section, a plate including a recessed portion and inserted in the container, and a wick inserted in the recessed portion of the plate.

In the heat pipe as disclosed in JP-A 2000-074579, the container of the heat pipe can be flattened, but the thickness of the heat pipe can be reduced only to a limited extent because the plate is arranged inside the container. The plate is arranged to position the wick inside the container, and the container cannot be flattened to such an extent that the plate is deformed.

SUMMARY OF THE INVENTION

A heat module according to a preferred embodiment of the present invention includes a fan and a heat pipe. The heat pipe has a flat cross section, is arranged to be in thermal contact with a heat source at one end, and is arranged to be in thermal contact with the fan at an opposite end. The fan includes an impeller, a motor, and a housing. The impeller includes a plurality of blades arranged in a circumferential direction about a central axis extending in a vertical direction. The motor is arranged to rotate the impeller. The housing is arranged to accommodate the impeller and the motor. The housing includes an air outlet arranged to open radially outwardly, a heat sink including a plurality of fins arranged along the air outlet, a side wall portion arranged to cover an outer circumference of the impeller, and a fan contact portion arranged to be in thermal contact with the heat pipe. The heat pipe includes a flat portion between both widthwise end portions of the heat pipe. The flat portion includes a recessed portion being recessed toward a center of the heat pipe in a cross section of the heat pipe perpendicular to a direction in which the heat pipe extends. The fan contact portion is at least partially made of a metal, is arranged to extend along a direction in which the fins are arranged, and is arranged to overlap with a portion of the heat sink in a plan view. A heat receiving portion is arranged between the heat source and the heat pipe, and includes a heat source contact portion arranged to be in thermal contact with the heat pipe. In at least a portion of the heat pipe which extends between a portion of the heat pipe which is in thermal contact with the fan contact portion and a portion of the heat pipe which is in thermal contact with the heat source contact portion, a difference between a maximum axial height of the heat pipe and a minimum axial height of a portion of the heat pipe where the recessed portion is defined is smaller than a wall thickness of the recessed portion.

According to the above preferred embodiment of the present invention, it is possible to provide a heat module having an excellent cooling characteristic and a reduced thickness, with the thickness of the heat pipe being minimized.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
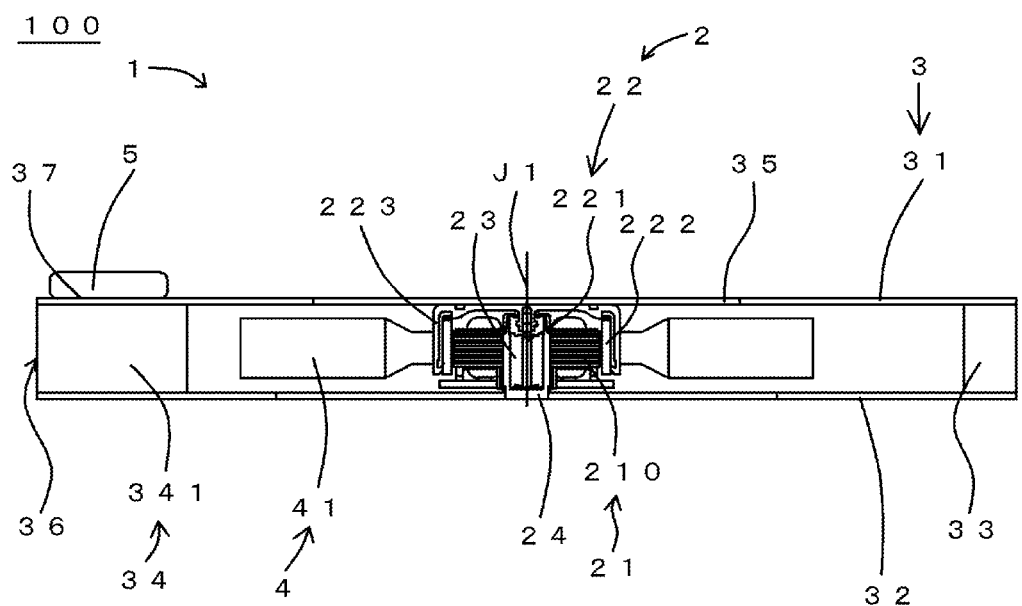
FIG. 1 is a cross-sectional view of a heat module according to a first preferred embodiment of the present invention.

It is assumed herein that an upper side and a lower side in an axial direction parallel to a central axis of a fan 1 of a heat module 100 in FIG. 1 are referred to simply as an upper side and a lower side, respectively. Note that a vertical direction assumed herein may not necessarily correspond with a vertical direction of the heat module 100 when the heat module 100 is actually installed in a device. It is also assumed herein that a circumferential direction about the central axis is referred to simply by the term "circumferential direction", "circumferential", or "circumferentially", and that radial directions centered on the central axis are referred to simply by the term "radial direction", "radial", or "radially".

Figure 2:
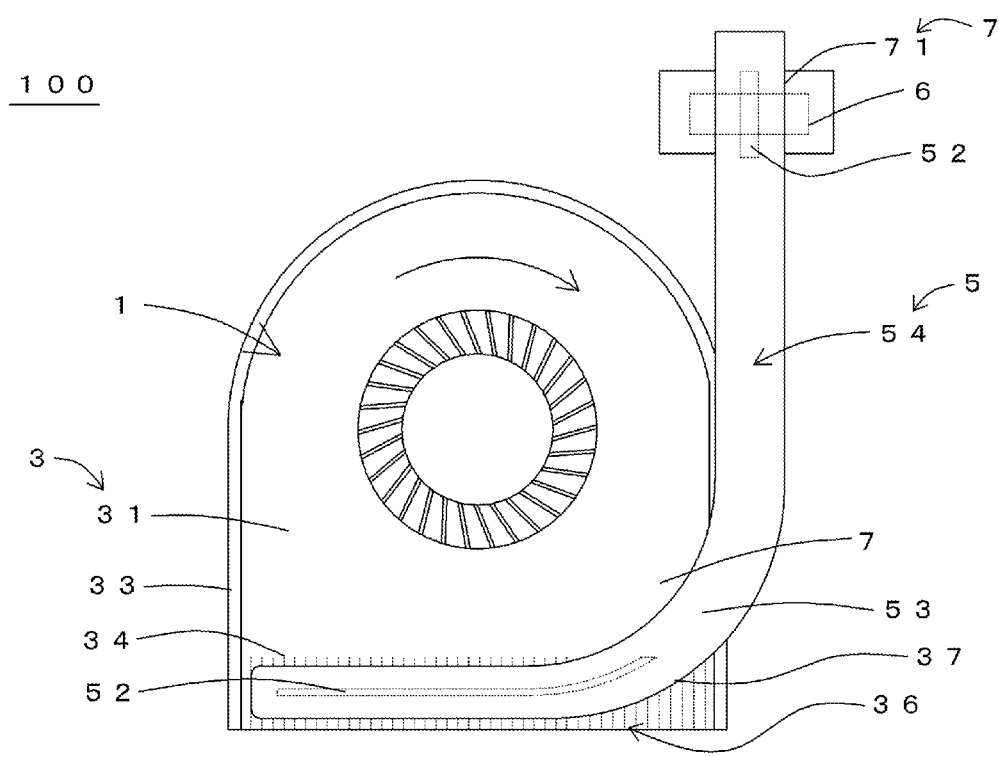
FIG. 2 is a top view of the heat module according to the first preferred embodiment of the present invention.

FIG. 1 is a cross-sectional view of a heat module 100 according to a first preferred embodiment of the present invention. The heat module 100 includes a fan 1 arranged to blow air in a predetermined direction, and a heat pipe 5 arranged to be in thermal contact with a heat source 6 at one end and arranged to be in thermal contact with the fan 1 at an opposite end as illustrated in FIG. 2. The fan 1 is a centrifugal fan. The heat module 100 is, for example, installed in a notebook personal computer (hereinafter referred to as a "notebook PC"), and is used to cool devices inside a case of the notebook PC.

The fan 1 includes a motor 2, a housing 3, and an impeller 4. The impeller 4 includes a plurality of blades 41 arranged in a circumferential direction about a central axis J1 extending in a vertical direction. The motor 2 is arranged to rotate the impeller 4 about the central axis J1. The housing 3 is arranged to accommodate the motor 2 and the impeller 4.

The motor 2 is an outer-rotor motor. The motor 2 includes a stationary portion 21, which is a stationary assembly, a rotating portion 22, which is a rotating assembly, and a sleeve 23, which is a bearing. The sleeve 23 is substantially cylindrical, and is centered on the central axis J1. The rotating portion 22 is supported by the sleeve 23 to be rotatable about the central axis J1 with respect to the stationary portion 21.

The stationary portion 21 includes a stator 210 and a bearing holding portion 24. The bearing holding portion 24 is arranged to accommodate the sleeve 23. The bearing holding portion 24 is substantially cylindrical, is centered on the central axis J1, and is made of a resin. The bearing holding portion 24 is arranged to project upward from a substantial center of a lower plate portion 32 described below. The bearing holding portion 24 is fixed in a hole portion (not shown) defined in the lower plate portion 32. A lower end portion of the bearing holding portion 24 and a portion of the lower plate portion 32 around the hole portion (not shown) are joined to each other through insert molding.

The stator 210 is annular, is centered on the central axis J1, and is attached to an outside surface of the bearing holding portion 24. The stator 210 includes a stator core (not shown) and a plurality of coils (not shown).

The rotating portion 22 includes a shaft 221, a rotor magnet 222, and a cup 223. The cup 223 is substantially in the shape of a covered cylinder, and is centered on the central axis J1. The cup 223 is arranged to be open downwardly. The shaft 221 is centered on the central axis J1, and an upper end portion of the shaft 221 is fixed to the cup 223. The rotor magnet 222 is substantially cylindrical, is centered on the central axis J1, and is fixed to an inner circumferential surface of a yoke (not shown) or an inside surface of the cup 223.

The shaft 221 is inserted in the sleeve 23. The sleeve 23 is defined by an oil-bearing porous metal body, and is inserted and fixed in the bearing holding portion 24. Note that a ball bearing, for example, may alternatively be used as a bearing mechanism.

The housing 3 includes an upper plate portion 31, the lower plate portion 32, a side wall portion 33, and a heat sink 34. The upper plate portion 31 is arranged to cover an upper side of the impeller 4. The lower plate portion 32 is arranged to cover a lower side of the impeller 4. The lower plate portion 32 is arranged to support the motor 2. The side wall portion 33 is arranged to cover a lateral side of the impeller 4. The upper plate portion 31, the side wall portion 33, and the lower plate portion 32 are arranged to together define an air channel portion (not shown) which surrounds the impeller 4.

Each of the upper and lower plate portions 31 and 32 is made of a metal, such as, for example, an aluminum alloy or stainless steel, and is defined in the shape of a thin plate. The side wall portion 33 is made of an aluminum alloy, and is molded by die casting. Alternatively, the side wall portion 33 may be molded of a resin. A lower end portion of the side wall portion 33 and an edge portion of the lower plate portion 32 are fastened to each other by, for example, screws. The upper plate portion 31 is fixed to an upper end portion of the side wall portion 33 by, for example, crimping. The upper plate portion 31 includes an air inlet 35. The air inlet 35 is arranged above the impeller 4. The upper plate portion 31, the side wall portion 33, and the lower plate portion 32 are arranged to together define an air outlet 36 on the lateral side of the impeller 4. The air outlet 36 is arranged to open radially outwardly in the housing 3. The heat pipe 5, which will be described below, is attached to an upper surface of the upper plate portion 31 of the housing 3. The heat pipe 5 is attached to a fan contact portion 37, which is in thermal contact with the heat pipe 5. The fan contact portion 37 is at least partially made of a metal. The fan contact portion 37 is arranged to overlap with the heat sink 34 in a plan view.

The heat sink 34 includes a plurality of fins 341. The fins 341 are a plurality of heat dissipating fins arranged in parallel with one another along the air outlet 36, each heat dissipating fin being substantially in the shape of the letter "U" and including an upper surface portion, a vertical surface portion, and a bottom surface portion, for example. With the heat dissipating fins being arranged in parallel with one another, the upper surface portion, the bottom surface portion, and the vertical surface portion of each heat dissipating fin and the vertical surface portion of an adjacent one of the heat dissipating fins together define a passage having a rectangular cross section. A wind caused by the fan 1 passes through this passage. The air outlet 36 is defined by radially outer ends of the fins 341, the upper plate portion 31, and the lower plate portion 32. In addition, the fan contact portion 37 of the housing 3 is arranged to extend along a direction in which the fins 341 are arranged.

The impeller 4 includes the plurality of blades 41. The blades 41 are arranged radially outside of the cup 223 in an annular shape with the central axis J1 as a center. A radially inner end portion of each blade 41 is fixed to an outside surface of the cup 223. A torque centered on the central axis J1 is produced between the rotor magnet 222 and the stator 210 as a result of supply of electric currents to the stationary portion 21. The impeller 4 is thus caused to rotate about the central axis J1 together with the rotating portion 22. Rotation of the impeller 4 causes air to be drawn into the housing 3 through the air inlet 35, and to be sent out through the air outlet 36.

FIG. 2 is a top view of the heat module 100 according to the first preferred embodiment of the present invention. A rotation direction of the fan 1 is indicated by an arrow in FIG. 2. The heat pipe 5 is arranged to be in thermal contact with the heat source 6 at one end, and is arranged to be in thermal contact with the fan 1 at the opposite end. A heat receiving portion 7 is arranged between the heat source 6 and the heat pipe 5. The heat receiving portion 7 includes a heat source contact portion 71 arranged to be in thermal contact with the heat pipe 5. According to the present preferred embodiment, the heat receiving portion 7 is defined by a member separate from the fan 1. As mentioned above, the housing 3 includes the fan contact portion 37 arranged to be in thermal contact with the heat pipe 5.

Figure 3:
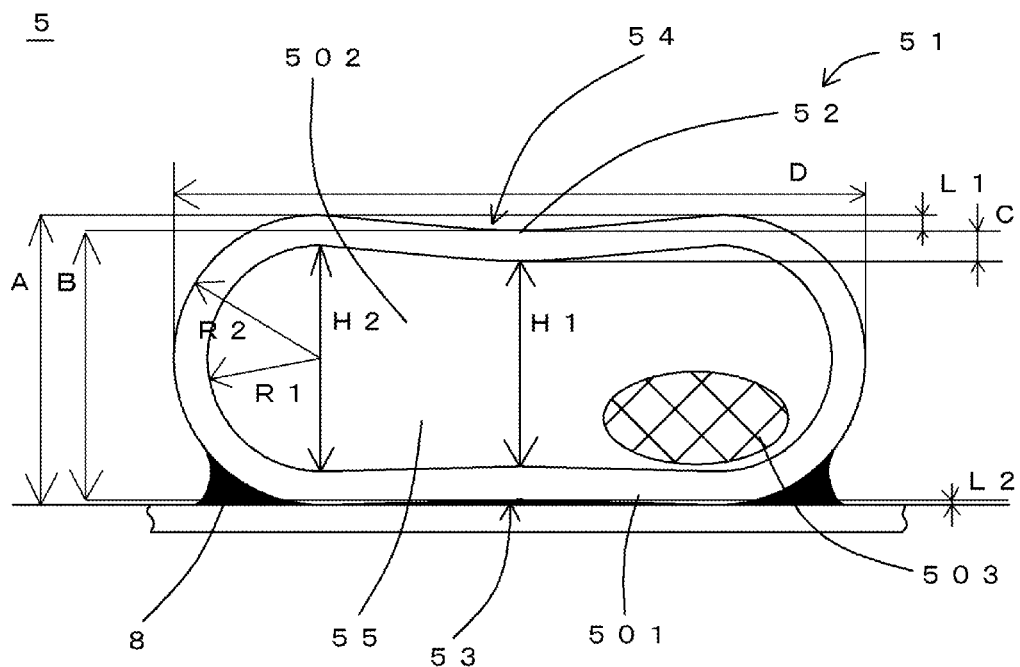
FIG. 3 is a cross-sectional view of a heat pipe according to the first preferred embodiment of the present invention taken along a plane perpendicular to a direction in which the heat pipe extends.

FIG. 3 is a cross-sectional view of the heat pipe 5 taken along a plane perpendicular to a direction in which the heat pipe 5 extends. The heat pipe 5 has a flat cross section. The heat pipe 5 includes a pipe portion 501, a working fluid 502 arranged inside the pipe portion 501, and a capillary structure 503 arranged inside the pipe portion 501. One end of the heat pipe 5 is attached to the upper surface of the upper plate portion 31 of the housing 3 such that the one end of the heat pipe 5 extends along the air outlet 36. The one end of the heat pipe 5 is arranged to be in thermal contact with the heat sink 34 through the upper plate portion 31. In other words, the fan contact portion 37 of the housing 3 is arranged to overlap with a portion of the heat sink 34 in a plan view.

The heat pipe 5 includes a flat portion 51 which is hollow and flat in a cross section perpendicular to the direction in which the heat pipe 5 extends. The flat portion 51 is a portion of the heat pipe 5 which extends between both widthwise end portions of the heat pipe 5. The flat portion 51 includes a recessed portion 52 which is recessed toward a center of the the heat pipe 5 in a cross section perpendicular to the direction in which the heat pipe 5 extends. The heat pipe 5 is defined in a flat shape as a result of a hollow circular pipe being pressed in the axial direction and being deformed to spread in a width direction. The recessed portion 52 is defined as a result of an internal stress caused by the axial pressing and deformation of the hollow pipe being concentrated on a widthwise middle of the heat pipe 5. The flat portion 51 of the heat pipe 5 includes a contact surface 53 and a non-contact surface 54. The contact surface 53 is arranged to be in contact with the fan contact portion 37 or the heat source contact portion 71. The non-contact surface 54 is on an axially opposite side with respect to the contact surface 53 (i.e., on an upper side in FIG. 3).

Referring to FIGS. 2 and 3, a difference between a maximum axial height A of the heat pipe 5 and a minimum axial height B of a portion of the heat pipe 5 where the recessed portion 52 is defined is smaller than a wall thickness C of the recessed portion 52 in at least a portion of the heat pipe 5 which extends between a portion of the heat pipe 5 which is in thermal contact with the fan contact portion 37 and a portion of the heat pipe 5 which is in thermal contact with the heat source contact portion 71.

There is a demand for a reduction in the thickness of the heat module 100 because of a recent reduction in the thickness of electronic devices. In the heat module 100, the heat pipe 5 is used as a structure to transfer heat from the heat source 6 to the heat sink 34. As illustrated in FIG. 2, the heat pipe 5 is arranged to axially overlap with the heat sink 34 to minimize a reduction in heat transfer efficiency in the heat sink 34. The closer the shape of the cross section of the heat pipe 5 is to a circle, the higher the heat transfer efficiency of the heat pipe 5 becomes, and the more flattened and thinner the heat pipe 5 is, the lower the heat transfer efficiency of the heat pipe 5 becomes. Meanwhile, the closer the shape of the cross section of the heat pipe 5 is to a circle, the greater the axial thickness of the heat pipe 5 becomes, requiring the heat sink 34 to have a correspondingly smaller axial dimension.

The heat sink 34 includes a channel passing therethrough in a radial direction. A reduction in the axial dimension of the heat sink 34 leads to a reduction in the cross-sectional area of the channel and an increase in channel resistance. That is, an air flow caused by the fan 1 is reduced in quantity, resulting in a situation in which forced cooling is not easy. Accordingly, the thickness of the heat pipe 5 is reduced to ensure a sufficient axial dimension of the heat sink 34 to ensure a sufficient cross-sectional area of the channel. That is, it is desirable to maximize the flattening of the heat pipe 5. As the flattening of the heat pipe 5 is increased, the widthwise middle of the heat pipe 5 is recessed toward the fan contact portion 37 or the heat source contact portion 71. The fan contact portion 37 and the heat source contact portion 71 will be hereinafter referred to collectively as the contact portions 37 and 71. Note that the term "flattening" as used herein refers to a numerical value obtained by subtracting the maximum axial height A from the width D of the heat pipe 5 and dividing the difference by the width D. Before the widthwise middle of the heat pipe 5 is recessed, springback would cause the widthwise middle of the heat pipe 5 to return toward its original axial position away from the contact portions 37 and 71 in a direction opposite to a direction in which the widthwise middle of the heat pipe 5 is pressed. That is, before the widthwise middle of the heat pipe 5 is recessed, dimensional control is difficult when the heat pipe 5 is worked on. Accordingly, the widthwise middle of the heat pipe 5 is pressed to such an extent that the widthwise middle of the heat pipe 5 is recessed, and both widthwise end portions of the heat pipe 5 are plastically deformed with round inner surfaces thereof increasing in curvature, resulting in reduced springback. As a result, the heat pipe 5 is the most distant from the contact portions 37 and 71 in the axial direction in the vicinity of both widthwise ends of the heat pipe 5.

However, if the extent of the above recess becomes greater than the wall thickness of a widthwise middle portion of the heat pipe 5, the axial height of an interior space 55 of the heat pipe 5 is reduced to such an extent as to cause a significant reduction in thermal conductivity of the heat pipe 5. Specifically, when the wall thickness C of the heat pipe 5 is 0.15 mm and the axial dimension of the heat pipe 5 from the contact portion 37 or 71 to the non-contact surface 54 of the heat pipe 5 is 0.7 mm, the extent of recess of the recessed portion 52 of the heat pipe 5 is equal to or greater than 0.15 mm. Meanwhile, when the wall thickness C of the heat pipe 5 is 0.15 mm and the axial dimension of the heat pipe 5 from the contact portion 37 or 71 to the non-contact surface 54 of the heat pipe 5 is 0.8 mm, the extent of recess of the recessed portion 52 of the heat pipe 5 is equal to or smaller than 0.15 mm. Here, the temperature of the heat source 6 is 85° C. in the former case and 76.1° C. in the latter case. Since the temperature of the heat source 6 is 75.4° C. when the axial dimension of the heat pipe 5 from the contact portion 37 or 71 to the non-contact surface 54 is 0.9 mm, it is apparent that the temperature of the heat source 6 exhibits a significant difference depending on whether the extent of recess of the recessed portion 52 of the heat pipe 5 is greater or smaller than the wall thickness of the heat pipe 5.

The heat pipe 5 is preferably arranged to have a flattening in the range of about 90% to about 94%. The non-contact surface 54 of the heat pipe 5 is arranged to slightly incline toward a widthwise middle of the non-contact surface 54, so that the recessed portion 52 is defined. At this time, the extent of recess of the recessed portion 52 is equal to or smaller than the wall thickness C of the pipe portion 501 of the heat pipe 5. That is, the greater the flattening of the heat pipe 5 is, the smaller the angle of inclination of the non-contact surface 54 to define the recessed portion 52 becomes. That is, the greater the flattening of the heat pipe 5 is, the greater the proportion of the area of the interior space 55 in the area of a cross section of the heat pipe 5 perpendicular to the direction in which the heat pipe 5 extends becomes. Meanwhile, the greater the flattening of the heat pipe 5 is, the smaller the area of the interior space 55 in a cross section perpendicular to the direction in which the heat pipe 5 extends becomes. When the flattening of the heat pipe 5 exceeds 94%, the axial height of a portion of the interior space 55 which is under a lowermost portion of the recessed portion 52 becomes extremely small, making it difficult for the working fluid 502 to travel therethrough. Meanwhile, when the flattening of the heat pipe 5 is below 90%, the recessed portion 52 is not defined.

That is, a combination of a minimum thickness of the heat pipe 5 and a prevention of an extreme reduction in the heat transfer efficiency of the heat pipe 5 can be accomplished by arranging the extent of recess of the widthwise middle of the heat pipe 5 (i.e., L1+L2) to be smaller than the wall thickness C of the heat pipe 5 in the widthwise middle.

According to the present preferred embodiment, the non-contact surface 54 of the heat pipe 5 is exposed as illustrated in FIG. 2. Although not shown in the figure, the non-contact surface 54 is arranged opposite to another component or a case of the device in which the heat module 100 is installed, and a gap between the non-contact surface 54 and the case is very small. In other words, within the device, the heat module 100 is arranged in an extremely small space. If the axial height of the heat pipe 5 were increased, the heat pipe 5 would be in contact with the device, and it would accordingly be necessary to reduce the axial dimension of the heat sink 34 or of the heat receiving portion 7. If the axial dimension of the heat sink 34 were reduced, the cross-sectional area of the channel would be reduced, resulting in a reduction in the air volume of the fan 1.

The heat receiving portion 7 is originally arranged to be thin, and it is difficult to further reduce the thickness of the heat receiving portion 7. The heat source 6 is arranged directly under the heat receiving portion 7. In addition, the heat source 6 is arranged at an axial position equivalent to the axial position of the fan 1 of the heat module 100. Therefore, increasing the axial height of the heat pipe 5 means reducing the axial height of the heat source 6. Examples of the heat source 6 include a CPU. Reducing the axial height of the CPU may lead to inferior specifications of the CPU. There is a heat module including a heat pipe which is fused, on all sides, with a fusing member having excellent thermal conductivity to make the most of a heat transfer characteristic and a heat dissipation characteristic of the heat pipe. Such a heat module, however, has an increased axial height, and is therefore unable to exhibit a high cooling performance while having an extremely small thickness, unlike the heat module 100 according to the present preferred embodiment.

The recessed portion 52 is arranged to extend in the direction in which the heat pipe 5 extends. Because the recessed portion 52 extends in the direction in which the heat pipe 5 extends, the cross section of the heat pipe 5 has a stable shape throughout the length of the heat pipe 5, and the working fluid 502 is able to travel smoothly throughout the length of the heat pipe 5. Thus, a reduction in the heat transfer efficiency of the heat pipe 5 is minimized.

The extent of recess of the recessed portion 52 is greater at a portion of the heat pipe 5 which is in thermal contact with the heat source contact portion 71 than at a portion of the heat pipe 5 which is in thermal contact with the fan contact portion 37. When the heat pipe 5 is fixed to the fan 1, the heat pipe 5 is pressed against the fan 1. Thus, a pressure with which the fan 1 and the heat pipe 5 are in surface contact with each other is increased, resulting in reduced thermal resistance, and a reduction in a heat transfer coefficient between the heat pipe 5 and the fan 1 is reduced. The pipe portion 501 of the heat pipe 5 is typically made of copper, and the heat pipe 5 itself has a function of dissipating heat outwardly. If the heat pipe 5 is able to efficiently receive heat from the heat receiving portion 7, the heat pipe 5 itself is able to dissipate the heat, and the fan 1 is able to perform forced cooling at an opposite end of the heat pipe 5. Thus, it is desirable to increase a pressure with which the heat pipe 5 and the fan 1 are in contact with each other at an area near the heat receiving portion 7. Meanwhile, if the heat pipe 5 is pressed against the fan 1 with a strong pressing force, the axial height of the heat pipe 5 is reduced, and the extent of recess of the recessed portion 52 is increased. However, at the heat receiving portion 7, the heat pipe 5 receives heat from the heat receiving portion 7, and the working fluid 502 vaporizes. Travel of a condensed portion of the working fluid 502 within the heat pipe 5 mainly occurs in a portion of the heat pipe 5 on a side of the heat receiving portion 7 closer to the opposite end of the heat pipe 5. Therefore, from the viewpoint of overall optimization of the heat module 100, the structure of the heat module 100 according to the present preferred embodiment is adopted to efficiently cool the heat source 6 while achieving a reduction in the thickness of the heat module 100.

Referring to FIGS. 2 and 3, a thermally conductive member 8 is arranged between the heat pipe 5 and the fan contact portion 37 and also between the heat pipe 5 and the heat source contact portion 71. When the heat pipe 5 and each of the fan contact portion 37 and the heat source contact portion 71 are arranged to be in thermal contact with each other through the thermally conductive member 8, the area of a contact surface therebetween is increased, and a reduction in a heat transfer characteristic is reduced. The thermally conductive member 8 is, for example, a solder, a thermal sheet, or a thermal diffusion graphite sheet.

The recessed portion 52 of the flat portion 51 is arranged to be in contact with the thermally conductive member 8. More specifically, the contact surface 53 is arranged to be in contact with the thermally conductive member 8. According to the present preferred embodiment, the contact surface 53 is a lower surface of the flat portion 51. That is, the lower surface of the flat portion 51 and the fan contact portion 37 of the housing 3 are arranged to be in contact with each other. In addition, the lower surface of the flat portion 51 and the heat source contact portion 71 of the heat receiving portion 7 are arranged to be in contact with each other. A reduction in the heat transfer characteristic can be reduced by arranging the recessed portion 52 of the heat pipe 5 and each of the contact portions 37 and 71 to be in thermal contact with each other through the thermally conductive member 8.

The extent L1 of recess of the recessed portion 52 in the non-contact surface 54 is greater than the extent L2 of recess of the recessed portion 52 in the contact surface 53. A distance between the heat pipe 5 and each of the contact portions 37 and 71 can be reduced by arranging the extent L1 of recess of the recessed portion 52 at the widthwise middle of the non-contact surface 54 to be greater than the extent L2 of recess of the recessed portion 52 at a widthwise middle of the contact surface 53. The thermally conductive member 8 typically has a thermal conductivity lower than that of the heat pipe 5. Thus, a reduction in the heat transfer efficiency can be minimized by reducing the distance between the heat pipe 5 and each of the contact portions 37 and 71.

In the cross section of the heat pipe 5 perpendicular to the direction in which the heat pipe 5 extends, a maximum axial height H2 of the interior space 55 of the heat pipe 5 is in the range of about three times the wall thickness C of the heat pipe 5 to about five times the wall thickness C of the heat pipe 5.

As described above, the heat pipe 5 is worked into the final shape thereof by pressing the hollow circular pipe from both sides in the axial direction, thereby deforming the hollow circular pipe into a flat shape. Once the heat pipe 5 is deformed by this process, the radii of curvature of both widthwise end portions of the heat pipe 5 gradually decrease, while the radii of curvature of upper and lower end portions of the heat pipe 5 gradually increase, with the shape of each of the upper and lower end portions of the heat pipe 5 becoming more and more flat. The heat pipe 5 gradually increases in width and decreases in height, thus becoming more and more flat. At this time, in each of both widthwise end portions of the heat pipe 5, an outer round portion R2 experiences an increased strength of stretching, and a break of any of the both widthwise end portions of the heat pipe 5 may occur. To prevent a break of each widthwise end portion of the heat pipe 5, it is necessary to arrange the radius of curvature of an inner round portion R1 of the widthwise end portion of the heat pipe 5 to be 1.5 or more times the wall thickness C of the heat pipe 5.

The wall thickness C of the heat pipe 5 cannot be uniform, taking account of an error in a process of shaping the heat pipe 5. In addition, as described above, the working fluid 502 and the capillary structure 503 are accommodated inside the heat pipe 5. In view of the above, the outer round portion R2 and the inner round portion R1 of each of both widthwise end portions of the heat pipe 5 do not have an identical radius of curvature after the heat pipe 5 is worked into the final shape by pressing and deforming. However, on the assumption that the outer round portion R2 and the inner round portion R1 of each of both widthwise end portions of the heat pipe 5 have an identical radius of curvature, the radius of curvature of the inner round portion R1 needs to be at least 1.5 times the wall thickness C of the heat pipe 5 to prevent a break of the outer round portion R2 of the heat pipe 5. In addition, when the heat pipe 5 is worked into the final shape by pressing and deforming, before the radius of curvature of the inner round portion R1 reaches 1.5 times the wall thickness C of the heat pipe 5, the strength of stretching at the outer round portion R2 becomes extremely high, and the extent of widthwise expansion of the heat pipe 5 is reduced. If the heat pipe 5 is further pressed and deformed, a moment or torque occurs at a boundary between the outer and inner round portions R2 and R1 and the flat portion to cause a recess of the flat portion, and the widthwise middle of the heat pipe 5 is gradually recessed. As a result, the interior space 55 of the heat pipe 5 has the greatest axial height near the boundary between the round portion and the flat portion 51 of the heat pipe 5. Accordingly, in view of the above, since the radius of curvature of the inner round portion R1 is 1.5 or more times the wall thickness C of the heat pipe 5, the axial height of the interior space 55 of the heat pipe 5 near the boundary between the round portion and the flat portion of the heat pipe 5 is three or more times the wall thickness C of the heat pipe 5. This condition is a condition which allows the extent of recess of the widthwise middle of the heat pipe 5 (i.e., L1+L2) to be equal to or smaller than the wall thickness C of the heat pipe 5.

In the cross section of the heat pipe 5 perpendicular to the direction in which the heat pipe 5 extends, a minimum axial height H1 of the interior space 55 of the heat pipe 5 is greater than the sum of the wall thickness C of the heat pipe 5 and the extent of recess of the recessed portion 52 (i.e., L1+L2). The heat transfer coefficient of the heat pipe 5 depends on the working fluid 502 and the capillary structure 503 in the interior space 55 of the heat pipe 5. Specifically, as the size of a space in which the working fluid 502 travels increases, the heat transfer coefficient of the heat pipe 5 increases. At a position axially overlapping with the lowermost portion of the recessed portion 52, the axial height of the interior space 55 of the heat pipe 5 is reduced by the extent of recess of the recessed portion 52. However, the cross-sectional area of the interior space 55 in a cross section perpendicular to a length of the interior space 55 does not depend on only the extent of recess of the recessed portion 52 because the pipe portion 501 of the heat pipe 5 has the wall thickness C. That is, as the wall thickness C of the pipe portion 501 of the heat pipe 5 increases, an increase in the extent of recess of the recessed portion 52 causes a greater reduction in the cross-sectional area of the interior space 55 of the heat pipe 5. Since the minimum axial height H1 of the interior space 55 of the heat pipe 5 is greater than the sum of the wall thickness C of the heat pipe 5 and the extent of recess of the recessed portion 52 (i.e., L1+L2), a sufficiently large cross-sectional area of the interior space 55 of the heat pipe 5 can be secured to ensure a high heat transfer coefficient of the heat pipe 5.

Figure 4:
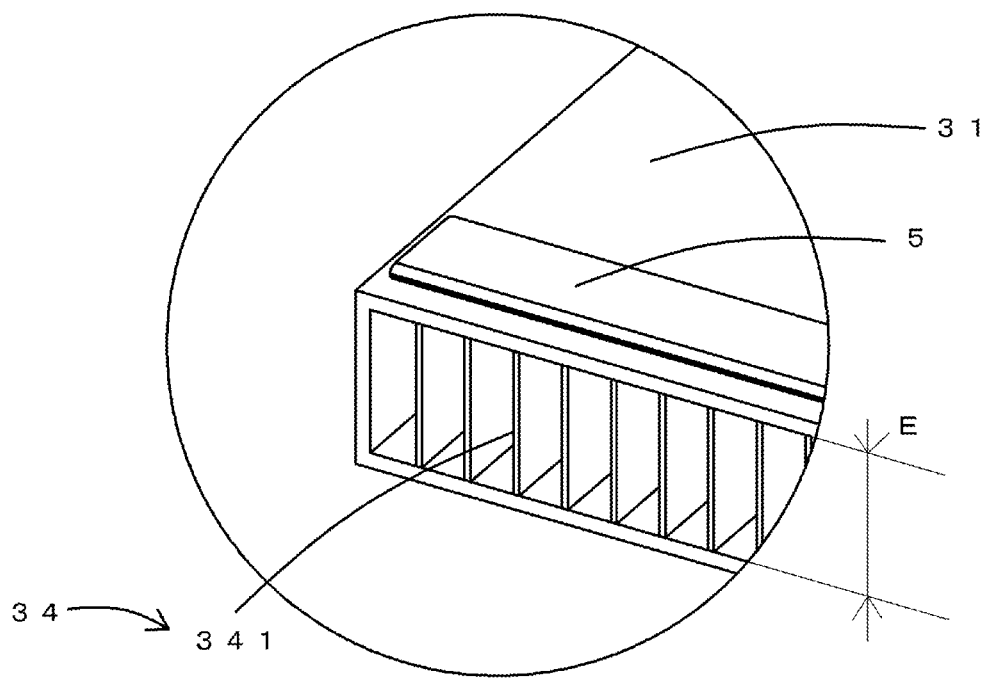
FIG. 4 is an enlarged view of a heat sink and its vicinity according to the first preferred embodiment of the present invention.

If the maximum axial height H2 of the interior space 55 of the heat pipe 5 is five times the wall thickness C of the pipe portion 501 of the heat pipe 5, a maximum axial height of the heat pipe 5 is seven times the wall thickness C of the pipe portion 501 of the heat pipe 5. When the wall thickness C is 0.15 mm, the maximum axial height of the heat pipe 5 is 1.05 mm. Since there has been a demand for a reduction in the thickness of the heat module 100 in recent years, the heat module 100 is required to have a thickness of about 5 mm. Accordingly, taking account of the thickness of the heat pipe 5, the heat sink 34 is required to have a thickness of 4 mm or less. FIG. 4 is an enlarged view of the heat sink 34 and its vicinity according to the first preferred embodiment. In general, in the case where a fan is arranged in a heat module, the air volume of the fan will be extremely small unless the fan has a thickness of 4 mm or more. Thus, taking account of portions of the fan 1 to which the fins 341 of the heat sink 34 are fixed and so on, the height E of each fin 341 will be about 3 mm. An air flow caused by rotation of the fan 1 is discharged out of the heat module 100 through the fins 341. In other words, the fins 341 are arranged at the air outlet 36 of the fan 1. The height E of each fin 341 is smaller than the dimension of the fan 1, and may become a cause for a reduction in the air volume of the fan 1. Thus, the height E of each fin 341 needs to be 4 mm or more to enable the fan 1 to carry out its function. Therefore, if the maximum axial height H2 of the interior space 55 of the heat pipe 5 is five or more times the wall thickness C of the pipe portion 501 of the heat pipe 5, an effect of forced cooling produced by the fan 1 will be little.

Figure 5:
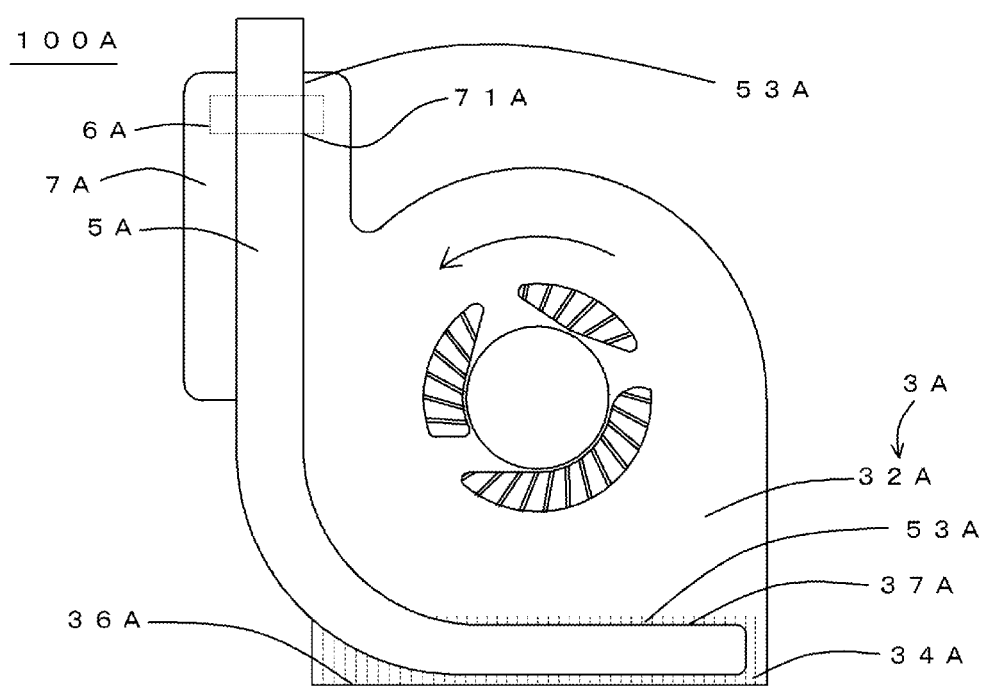
FIG. 5 is a bottom view of a heat module according to a second preferred embodiment of the present invention.

FIG. 5 is a bottom view of a heat module 100A according to a second preferred embodiment of the present invention. The basic structure of the heat module 100A according to the second preferred embodiment is identical to the basic structure of the heat module 100 according to the first preferred embodiment. Accordingly, a description of the second preferred embodiment will be limited to differences from the first preferred embodiment. In the first preferred embodiment, the fan contact portion 37 arranged to be in contact with one end of the heat pipe 5 is included in the upper plate portion 31 of the housing 3. In other words, the contact surface 53 is included in a lower surface of the heat pipe 5. On the other hand, in the second preferred embodiment, a lower surface of a lower plate portion 32A of a housing 3A includes a fan contact portion 37A arranged to be in contact with one end of a heat pipe 5A along an air outlet 36A. In other words, an upper surface of the heat pipe 5A includes a contact surface 53A. That is, the one end of the heat pipe 5A is arranged to be in thermal contact with a heat sink 34A through the lower plate portion 32A.

Further, in the first preferred embodiment, at one end of the heat pipe 5, the heat source 6, the heat receiving portion 7, and the heat pipe 5 are arranged to be in thermal contact with one another, with the heat source 6 at a bottom, the heat receiving portion 7 in the middle, and the heat pipe 5 at a top in the axial direction, and the contact surface 53 is included in the lower surface of the flat portion 51 at the one end of the heat pipe 5. On the other hand, in the second preferred embodiment, at one end of the heat pipe 5A, the heat pipe 5A, a heat receiving portion 7A, and a heat source 6A are arranged to be in thermal contact with one another, with the heat pipe 5A at a bottom, the heat receiving portion 7A in the middle, and the heat source 6A at a top in the axial direction, and the contact surface 53A is included in an upper surface of a flat portion (not shown). Note that positions where the fan contact portion 37A and a heat source contact portion 71A, respectively, are arranged depend on how the heat module 100A is attached to an electronic device and on arrangement of the heat source 6A, and that a beneficial effect produced by the present preferred embodiment is similar to a beneficial effect produced by the first preferred embodiment.

While, in the first preferred embodiment, the heat receiving portion 7 is defined by a member separate from the fan 1, the heat receiving portion 7A is defined integrally with the housing 3A of a fan 1A. That is, the housing 3A includes both the fan contact portion 37A and the heat source contact portion 71A.

Figure 6:
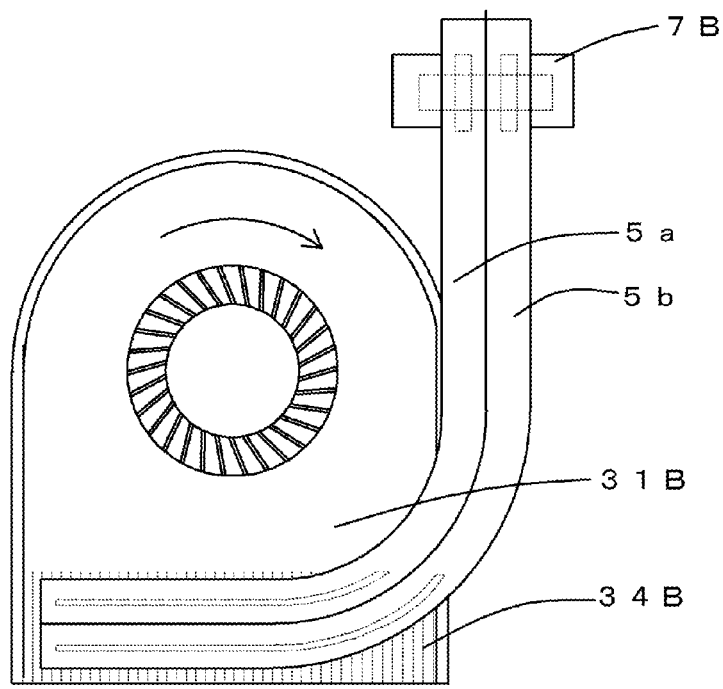
FIG. 6 is a top view of a heat module according to a third preferred embodiment of the present invention.

FIG. 6 is a plan view of a heat module 100B according to a third preferred embodiment of the present invention. The basic structure of the heat module 100E according to the third preferred embodiment is identical to the basic structure of the heat module 100 according to the first preferred embodiment. Accordingly, a description of the third preferred embodiment will be limited to differences from the first preferred embodiment. While, in the first preferred embodiment, the single heat pipe 5 is thermally connected to the fan 1 and the heat source 6, the heat module 100E according to the third preferred embodiment includes a first heat pipe 5a and a second heat pipe 5b. In a plan view, the first heat pipe 5a and the second heat pipe 5b are arranged to adjoin each other on a heat receiving portion 7B.

Referring to FIG. 3, the capillary structure 503 is arranged on either side of the widthwise middle of the heat pipe 5. A vaporized portion of the working fluid 502 is condensed, and returns toward the heat source 6 through the capillary structure 503. Therefore, in the third preferred embodiment, in each of the first and second heat pipes 5a and 5b, a condensed portion of a working fluid (not shown) returns toward a heat source through an area on either side of the widthwise middle of the first or second heat pipe 5a or 5b. In addition, when the first and second heat pipes 5a and 5b are arranged to adjoin each other, heat received by one of the first and second heat pipes 5a and 5b is transferred to the other one of the first and second heat pipes 5a and 5b. In each of the first and second heat pipes 5a and 5b, the working fluid (not shown) gathers in the vicinity of a capillary structure (not shown), and accordingly, heat received by each one of the first and second heat pipes 5a and 5b is transferred to the closest capillary structure (not shown) to improve a heat transfer coefficient. That is, an improvement in heat transfer efficiency is achieved by arranging the first heat pipe 5a and the second heat pipe 5b to adjoin each other. Note that only one of the first and second heat pipes 5a and 5b may be arranged to overlap with a heat sink 34B in a plan view and to be in thermal contact with the heat sink 34B, with the other one of the first and second heat pipes 5a and 5b overlapping with an upper plate portion 31B in a plan view and to be in thermal contact with the upper plate portion 31B. Also note that the first and second heat pipes 5a and 5b may be arranged to adjoin each other only at the heat receiving portion 7B, and may be out of contact with each other except at the heat receiving portion 7B.

Centrifugal fans according to preferred embodiments of the present invention are usable to cool devices inside cases of notebook PCs and desktop PCs, to cool other devices, to supply air to a variety of objects, and so on. Moreover, centrifugal fans according to preferred embodiments of the present invention are also usable for other purposes.

What is claimed is:

1. A heat module comprising:
a fan; and
a heat pipe having a flat cross section, arranged to be in thermal contact with a heat source at one end, and arranged to be in thermal contact with the fan at an opposite end; wherein
the fan includes:
    an impeller including a plurality of blades arranged in a circumferential direction about a central axis extending in a vertical direction;
    a motor arranged to rotate the impeller; and
    a housing arranged to accommodate the impeller and the motor;
the housing includes an air outlet arranged to open radially outwardly, a heat sink including a plurality of fins arranged along the air outlet, a side wall portion arranged to cover an outer circumference of the impeller, and a fan contact portion arranged to be in thermal contact with the heat pipe;
the heat pipe includes a flat portion between both widthwise end portions of the heat pipe;
the flat portion includes a recessed portion being recessed toward a center of the heat pipe in a cross section of the heat pipe perpendicular to a direction in which the heat pipe extends;
the fan contact portion is at least partially made of a metal, is arranged to extend along a direction in which the fins are arranged, and is arranged to overlap with a portion of the heat sink in a plan view;
a heat receiving portion is arranged between the heat source and the heat pipe, and includes a heat source contact portion arranged to be in thermal contact with the heat pipe;
in at least a portion of the heat pipe which extends between a portion of the heat pipe which is in thermal contact with the fan contact portion and a portion of the heat pipe which is in thermal contact with the heat source contact portion, a difference between a maximum axial height of the heat pipe and a minimum axial height of a portion of the heat pipe where the recessed portion is defined is smaller than a wall thickness of the recessed portion, the flat portion of the heat pipe includes a contact surface arranged to be in contact with the fan contact portion or the heat source contact portion, and a non-contact surface arranged on an axially opposite side with respect to the contact surface; and an extent of recess of the recessed portion is greater at the non-contact surface than at the contact surface.

2. The heat module according to claim 1, wherein the recessed portion is arranged to extend in the direction in which the heat pipe extends.

3. The heat module according to claim 2, further comprising a thermally conductive member arranged between the heat pipe and the fan contact portion and also between the heat pipe and the heat source contact portion.

4. The heat module according to claim 3, wherein the recessed portion is arranged to be in contact with the thermally conductive member.

5. The heat module according to claim 1, further comprising a thermally conductive member arranged between the heat pipe and the fan contact portion and also between the heat pipe and the heat source contact portion.

6. The heat module according to claim 5, wherein the recessed portion is arranged to be in contact with the thermally conductive member.

7. The heat module according to claim 1, wherein a maximum axial height of an interior space of the heat pipe is in a range of about three times a wall thickness of the heat pipe to about five times the wall thickness of the heat pipe in the cross section of the heat pipe perpendicular to the direction in which the heat pipe extends.

8. The heat module according to claim 1, wherein a minimum axial height of an interior space of the heat pipe is greater than a sum of a wall thickness of the heat pipe and an extent of recess of the recessed portion in the cross section of the heat pipe perpendicular to the direction in which the heat pipe extends.

9. The heat module according to claim 1, wherein an extent of recess of the recessed portion is greater at the portion of the heat pipe which is in thermal contact with the heat source contact portion than at the portion of the heat pipe which is in thermal contact with the fan contact portion.

10. The heat module according to claim 1, wherein
the heat pipe includes a first heat pipe and a second heat pipe; and
the first heat pipe and the second heat pipe are arranged to adjoin each other at the heat receiving portion.

* * * * *